United States Patent Office 2,857,395
Patented Oct. 21, 1958

---

2,857,395

DERIVATIVES OF ALPHA-N-(BETA-DIALKYL-AMINO ALKYL)-AMINO-PHENYL ACETIC ACID ESTERS

Herbert Arnold, Bielefeld, Engelbert Kühas, Gadderbaum, and Norbert Brock, Wadersloh, Germany No Drawing. Application April 5, 1956
Serial No. 576,255

Claims priority, application Germany April 9, 1955

2 Claims. (Cl. 260—310)

The invention relates to apha-N-(beta-dialkylaminoethyl) amino-phenylacetic acid ester derivatives.

In Patent No. 2,665,300, a method for the preparation of alpha-N-(beta-dialkylaminoethyl) amino-phenylacetic esters has been disclosed, of which the iso-amyl ester of the formula

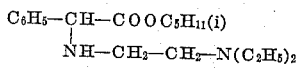

has proved particularly valuable for the treatment of spasms on muscular as well as neural basis.

We have found that products of particularly interesting pharmacological properties are obtained by reacting esters of the type recited above with pyrazolone aminomethane sulfonic acids. A particularly suitable example of such acids is 1-phenyl-2,3-dimethyl-4-(N-sulfomethyl, N-methyl) amino pyrazolone-5 of the formula

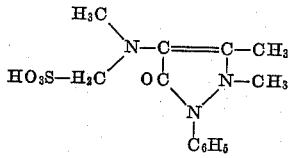

These esters and acids react to form water-soluble salts which are pharmacologically compatible and have a therapeutic efficiency by far superior to the efficiency of the components.

Sodium salts of 1-phenyl-2,3-dimethyl-4-(N-sulfomethyl, N-methyl) amino pyrazolone-5 are known to have, in addition to a dominant analgesic effect, a slight myotropic-spasmolytic action. However, while with respect to the spasmolytic action, the average efficient dose of the 1-phenyl-2,3-dimethyl-4-(N-sulfomethyl, N-methyl) amino pyrazolone-5 component alone is about 1:500 to 1:1000, and the average efficient dose of alpha-N-(beta-diethylamino ethyl) amino-phenylacetic iso-amyl ester alone is at about 1:225,000, the corresponding dose of the salt of said two components is about 1:480,000. The salt, compared with the individual components, shows more than a double increase of the efficacy; therefore, it is not a simple addition of the spasmolytic properties of the components of the salt but a synergistic action is involved, which has been confirmed in clinical tests.

The salts may be prepared by reacting equivalent amounts of a water-soluble salt, preferably of the sodium salt of the pyrazolone aminomethane sulfonic acid component, in aqueous solution with an acid salt, preferably a sulfate of the ester. The inorganic salt, for instance sodium sulfate, is precipitated, and it remains an aqueous solution of the pyrazolone aminomethane sulfonic acid salt of the alpha-N-(beta diethylamino ethyl) amino-phenylacetic ester, whereby said salt is composed of 1 mole of the ester and two moles of the pyrazolone aminomethane sulfonic acid component.

The solid salt may be recovered from the solution in a simple manner, for instance by evaporating the water in vacuo and extracting the residue with absolute ethyl alcohol, whereby the remained inorganic salt is removed. By distilling off the alcohol, a hard, glassy, very hygroscopic mass is obtained, which is very readily dissolved in water.

The following examples are illustrative of the manner of preparation of the novel compounds of this invention.

Example 1

A solution of of 81.5 g. of alpha-N-(beta-diethylamino ethyl)-amino-phenylacetic acid-iso-amyl ester in dilute sulfuric acid (25 g. of conc. $H_2SO_4$ and 110 cu. cm. of water) is added, with cooling, to a solution of 170 g. of the sodium salt of 1-phenyl-2,3-dimethyl-4-(N-sulfomethyl, N-methyl) amino pyrazolone-5 in 200 cu. cm. of water. The mixture is cooled with ice, and the precipitated $Na_2SO_4$ is filtered off and rinsed twice with 25 cu. cm. of ice water each.

The combined solutions are brought to the desired concentration and adjusted to the desired pH with suitable buffering substances.

Example 2

The same components as in Example 1 are reacted in aqueous solution; the water is then removed at a reduced pressure of 12 to 20 mm. Hg and a temperature of 30° to 80° C. The residue is extracted with absolute alcohol. Subsequently, the undissolved $Na_2SO_4$ is sucked off, and the alcoholic extract is evaporated to dryness in vacuo. The dry residue is dissolved in water to an about 2.4 percent solution, which is adjusted to a pH of about 4.3 to 4.5.

The above defined salts of alpha-N-(beta-dialkylaminoalkyl)-amino-phenylacetic acid ester, particularly the 1-phenyl-2,3-dimethyl-4-(N-sulfomethyl, N-methyl) amino pyrazolone-5 salt of alpha-N-(beta-diethylamino ethyl)-amino-phenyl acetic acid iso-amyl ester relieve promptly severe colics of the inner organs. Heretofore, the same relief could be obtained only by opiates; the novel preparations have the advantage of excluding any risk of chronic poisoning, and particularly the danger of addiction.

We claim:

1. As a novel compound, the salt of 1-phenyl-2,3-dimethyl-4-(N-sulfomethyl, N-methyl) amino pyrazolone-5 with alpha-N-(beta-dialkylamino alkyl) amino-phenylacetic acid isoamyl ester, said salt having the formula

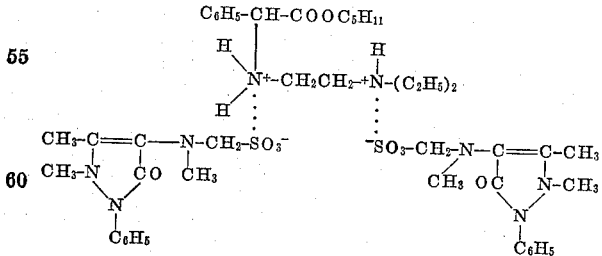

2. An aqueous solution containing about 2.4 percent by weight of the salt defined in claim 1 at a pH of about 4.3 to 4.5.

No references cited.